United States Patent [19]

Wober

[11] Patent Number: 5,235,434
[45] Date of Patent: Aug. 10, 1993

[54] METHOD AND APPARATUS FOR SELECTIVELY ADJUSTING THE BRIGHTNESS OF LARGE REGIONS OF AN IMAGE

[75] Inventor: Munib Wober, Haverhill, Mass.

[73] Assignee: Polaroid Corporation, Cambridge, Mass.

[21] Appl. No.: 722,218

[22] Filed: Jun. 27, 1991

[51] Int. Cl.⁵ .................. H04N 1/40; G06K 9/38; G06K 9/40
[52] U.S. Cl. .................................. 358/448; 358/447; 358/465; 382/52; 382/54
[58] Field of Search ............... 358/426, 432, 433, 448, 358/462, 464, 465, 447; 382/50, 52, 53, 54, 56

[56] References Cited

U.S. PATENT DOCUMENTS 4,703,363 10/1987 Kitamura ............................ 358/448
4,747,156 5/1988 Wahl .................................... 382/54
4,841,374 6/1989 Kotani et al. ....................... 358/464
4,903,316 2/1990 Hongo et al. ....................... 382/52
4,999,629 3/1991 Katsuta .............................. 358/462

Primary Examiner—Edward L. Coles, Sr.
Assistant Examiner—Thomas D. Lee
Attorney, Agent, or Firm—Edward S. Roman

[57] ABSTRACT

The invention concerns a method for rendering scene information in images having a large dynamic range, i.e. sunny and shady areas. The method takes particular advantage of image segmentation and computations employed in compression of images for electronic still photography. In distinguishing large areas, the method selectively adjusts the brightness of all portions of the area without necessarily preserving contrast which avoids halo artifacts. Those portions in areas of intermediate size are subjected to a smoothing feature which avoids the production of artifacts in the form of a line at the boundary.

28 Claims, 6 Drawing Sheets

METHOD AND APPARATUS FOR SELECTIVELY ADJUSTING THE BRIGHTNESS OF LARGE REGIONS OF AN IMAGE

BACKGROUND OF THE INVENTION

1. Field of the Invention

This invention relates generally to a method and apparatus for improving the quality of photographic images and, more particularly, to improving digital images by selectively adjusting the brightness of large regions in such images without adversely affecting other regions regardless of size by leaving artifacts at the boundaries.

2. Description of the Prior Art

Real complex scenes have a luminance dynamic range that spans four decades. Hardcopy output media, however, are limited to about two decades. Humans can distinguish image features over the wide range of luminance in real scenes by an adjustment process which is not entirely understood but which is, nevertheless, observable. Various approaches have been attempted to compensate for the limitations of hardcopy media. The preferred conventional solution to the problem is known as tone compression of input scene luminance by means of a so called H and D curve. The approach essentially clips or reduces the visibility detail in dark and light areas and properly renders the midtones. The method inherently results in the loss of information at the extremes of the compression curve known as the toe and shoulder. Some variation of image quality is possible by adjustment of where in the curve the image is developed. This may be accomplished by means of filters and adjustment of print exposure time or intensity.

Unfortunately, the conventional method may result in lost information and reduced picture quality when the scene has extremely bright or dark areas. For example, scenes with a large shaded area and an adjacent bright or sunny area are especially difficult to develop or display without loss of some image quality in either or both of the dark and bright regions. Conventional methods for example preserve edge contrast at the boundary between large dark areas and large bright areas. The resulting adjustment leaves an artifact in the form of a halo at the boundary which resembles misregistration.

While adjustment of the exposure aperture setting, the time of exposure and the employment of filters can improve the image, it is not possible to efficiently bring up or brighten the dark areas without adversely affecting the light areas and vice versa. Also, it is not possible to effectively distinguish large areas which require adjustment from small areas such as image details or the like which do not require any appreciable adjustment. Further, the methods which have been employed are essentially optical or mechanical systems and not electronic systems.

The causes of diminished image quality are equally applicable in systems employing electronic processing of still photographic images. Its with this form of photography that the present invention is primary concerned. It should be understood, however, that the invention is useful with other forms of image processing. The invention however is not designed to correct for exposure errors. It assumes image details in the midtones is properly rendered.

SUMMARY OF THE INVENTION

The present invention has been devised in order to obviate the shortcomings and limitations of the described prior arrangements by selectively adjusting the brightness of large areas and thereby recovering such information without adversely affecting other areas including details in small bright and dark areas.

In particular, the invention concerns a method for rendering scene information in images having a large dynamic range, i.e. sunny and shady areas. The method takes particular advantage of image segmentation and computations employed in compression of images for electronic still photography.

Of particular concern is the avoidance of artifacts at boundaries where there is a transition in the image scene from the bright to the dark areas. In distinguishing large areas, the method selectively adjusts the brightness of all portions of the area to be adjusted. Preservation of the contrast at the boundary is not necessary and is obviated by the present invention thereby avoiding a halo artifact. Those portions near the boundary of smaller areas are subjected to a size dependent smoothing feature which avoids the production of an artifact in the form of a line at the discontinuity.

In an exemplary embodiment for brightening dark areas, the invention is directed to an apparatus for compressing the dynamic range of a digital image made up of an array of individual pixels by selectively adjusting the brightness of such pixels in large areas. Individual pixels are grouped in blocks, hereinafter called superpixels. Each superpixel is assigned an average value which is derived from the values of all the individual pixels in the block. A superpixel selector selects superpixels for comparison with a selected darkness threshold value indicative of a sufficiently bright pixel. A comparator responsive to the superpixel selector sequentially compares each selected superpixel with the threshold and produces a first output when the selected superpixel value is above the threshold and produces a second output when the selected superpixel value is below the threshold. Means is responsive to the first output for designating or assigning a corresponding size value and a corresponding average value for each selected superpixel and causes the superpixel selector to increment to the next superpixel. The means for assigning the size and average value is responsive to the second output for causing the selector to select a set of superpixels surrounding the selected superpixel for comparison with the darkness threshold and for causing the comparator to compare each superpixel in the set surrounding the selected superpixel with the threshold value for producing the first output if at least one of said superpixels in the set has a value greater than the darkness threshold and producing the second output if all the superpixels in the set have a value below the darkness threshold. The means for assigning size and average value respond to produce the second output up to a selected maximum number of sets of superpixels. A size comparator compares the corresponding size of each selected superpixel with the size corresponding to the selected number of sets and produces a first size output when the size of the selected superpixel and any superpixel in a next smaller set is the same as the maximum number of sets. The size comparator provides a second size output when the size of the next smaller set is less than the maximum number of sets. An adder responsive to the first size signal adds the value of the selected superpixel to the size value. A multiplier responsive to the second size signal multiplies the value of the selected superpixel by a smoothing characteristic in accordance with the size of the superpixel, and the adder adds the resulting value to the size of the selected superpixel. In either case, the average value of the superpixel is changed. The change in the average value as a result of this process is interpolated back to change the individual pixels in the superpixel. That is, each individual pixel is brightened in accordance with the increase in the average value of the superpixel.

In another exemplary embodiment for selectively darkening bright areas the same process may be employed with the exception that the adjustment is made for superpixels which have a value above a selected brightness threshold which indicates that the superpixel is overly bright. Alternatively, a dark threshold and a brightness threshold may be selected and the process may be employed to selectively adjust the brightness of superpixels between the darkness threshold and the brightness threshold.

Another embodiment of the invention comprises a method for compressing the dynamic range of a digital image made up of an array of superpixels by selectively adjusting the value of superpixels in large areas of the image. The method comprises the steps of: selecting a superpixel from the array; comparing the value of the superpixel with a threshold defining an acceptable level of brightness; producing a first signal when the selected superpixel value is within the acceptable level of brightness and producing a second signal when the superpixel value is not at an acceptable level of brightness; assigning a first size and average value to the selected superpixel; and selecting the next superpixel in response to the first signal. In response to the second signal each one of a first set of superpixels surrounding the selected superpixel is compared with the threshold for producing the first and second signals. A next succeeding larger size and corresponding average value is assigned to the selected superpixel in response to the first signal. Each one of a successive number of sets of superpixels, up to a maximum number, surrounding the first set is compared as before for producing one of the first and second signals for designating a next successive larger size and corresponding average value thereto. The size of each superpixel is compared with the size for the maximum number of selections and one minus the maximum number of selections and the average for the maximum number of selections is algebraically added to the value of the selected superpixel when its size or any pixel in the next smaller size equals the maximum. Otherwise, the average superpixel value is multiplied by a smoothing factor and algebraically added to the pixel value when the value of the next smaller size does not equal the maximum. The method may be employed to darken bright areas above a selected brightness threshold and to brighten dark areas below a selected darkness threshold at the same time.

DESCRIPTION OF THE PREFERRED EMBODIMENT

Figure 1:
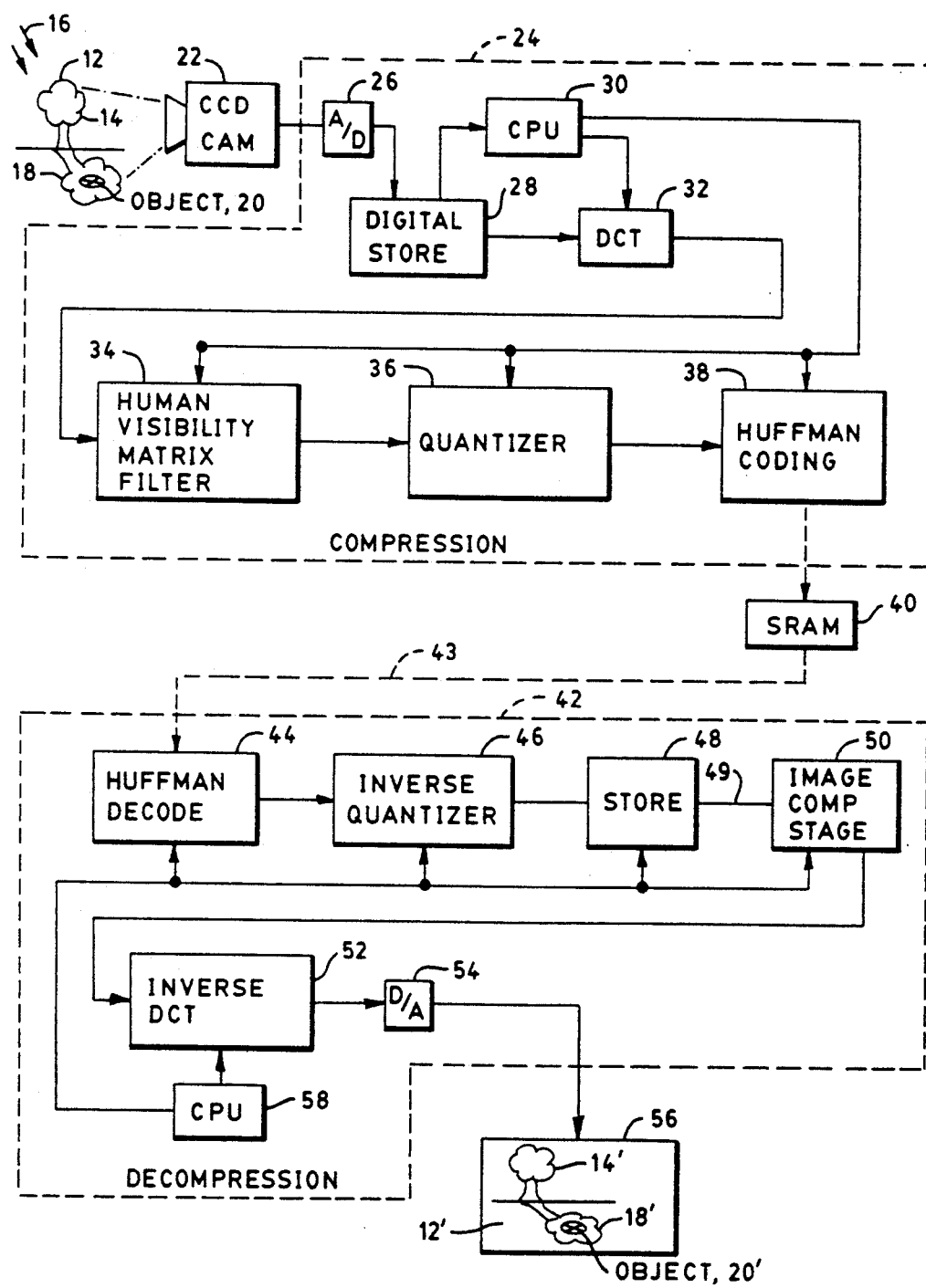
FIG. 1 is a schematic block diagram of a system for compressing digital image data of a scene including apparatus for selectively adjusting the brightness of the image in accordance with the present invention.

Referring to FIG. 1 there is shown generally a system 10 for capturing an image 12, compressing and storing the image for display at a later time, and decompressing the stored image and displaying the same. In the illustration the image 12 comprises a tree 14 which is illuminated by ambient light (arrow 16) casting a shadow 18 on the ground as illustrated. An object 20 is located in the shadow 18. The illustrative image 12 has a large dynamic range. If the object 20 is located partially or entirely within the shadow 18, but for the present invention, some information will normally be lost. It should be understood that the object 20 may be in a bright area (not shown) and the principles of the invention would be equally applicable for rendering the object visible as hereinafter described.

The image 12 is captured by an input device such as a CCD camera 22 and is processed by an image processing device or compression stage 24. The camera 22 may be directly coupled to an analog to digital converter 26 in the compression stage 24 which produces a digital image signal. A storage device 28 receives and stores the data preferably in the form of superpixels which are $8 \times 8$ arrays of individual pixels. While the invention is implemented using superpixels because they may be processed more quickly than individual pixels it is within the teaching of the invention to utilize individual pixels or groups of pixels as desired. A central processing unit 30 clocks the image signal to the storage device 28 and governs the operation of other devices.

The stored image data is fed to a discrete cosine transform or DCT 32 which converts the digital information into a series of coefficients. The transformed data is thereafter coupled to a human visibility matrix filter 34 which discards certain high frequency coefficients considered to be relatively unimportant to good picture quality. For example, certain high frequency color information is filtered out because it is not readily perceived by the human eye and thus the information may be simplified for later processing. The transformed and filtered digital data is thereafter quantized in a quantizer 36 which establishes selected levels of the digital data in a given range of discrete available levels. The quantized data is then encoded by means of a huffman coding device 38 which compresses the quantized data by a known encoding technique. It should be understood that coding algorithms other than huffman coding may be employed if desired. The encoded information may then be thereafter stored in a storage device such as a static RAM (SRAM) 40.

If desired at some later time, the information in SRAM 40 may be fed to an image processing apparatus or decompression stage 42 by any convenient transmission link 43. Here a huffman decoding device 44 decodes the data which is then coupled to an inverse quantizer 46. The data is stored as superpixels in storage device 48. In accordance with the present invention the stored data is coupled to an image compensation stage 50 which electronically processes the data so as to selectively adjust the brightness of portions of the image 12 which lie in the shadow 18 thereby enhancing the image and retrieving otherwise lost information. The compensated data is converted to digital data by means of inverse DCT 52. Thereafter the data may be converted to an analog signal by digital to analog converter 54 which is coupled to display 56. A modified version of the original image 12 is reproduced as displayed image 12' including the tree 16', the shadow 20' and the object 20' which is enhanced and more clearly visible in display 54. CPU 58 in the compression stage 42 regulates the various devices therein as illustrated and may manipulate the data as hereinafter described.

Figure 2:
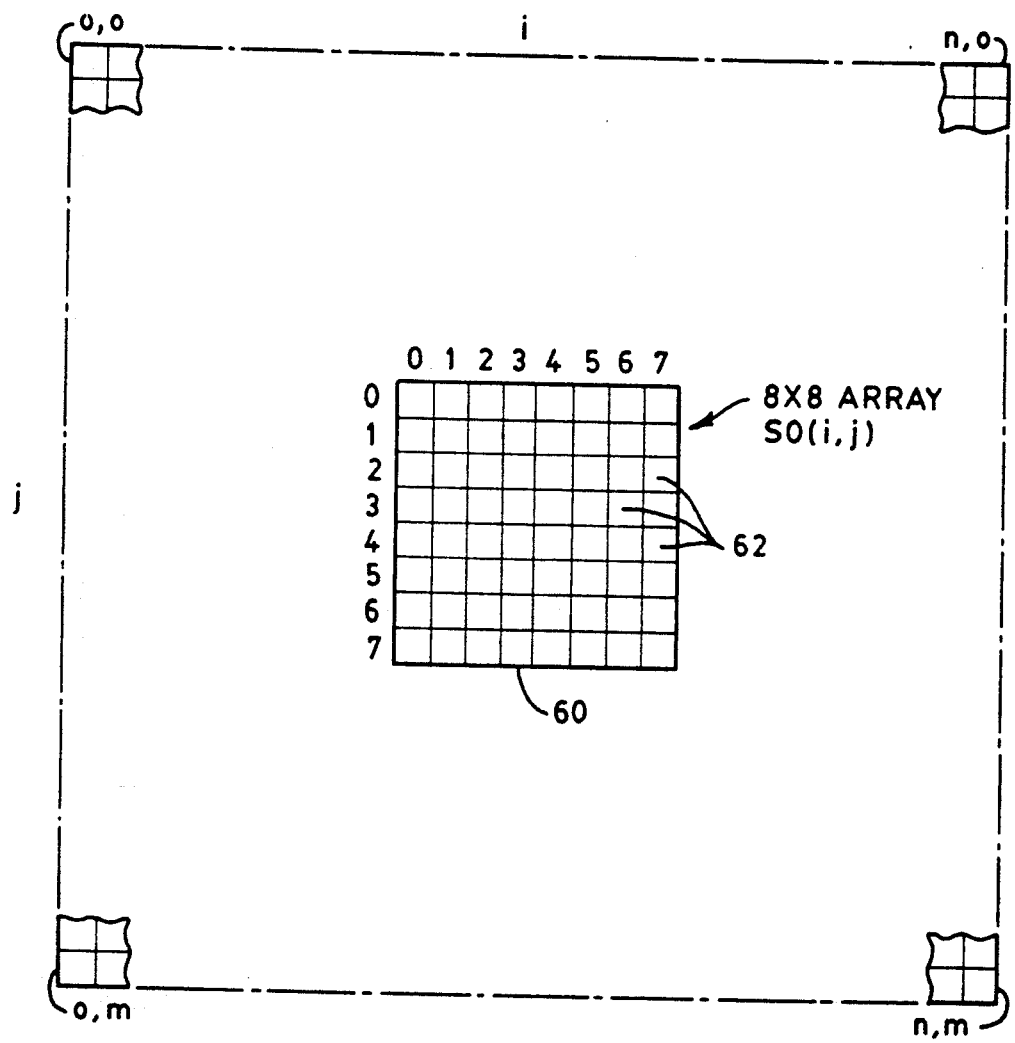
FIG. 2 illustrates a fragmentary array of pixels forming an image including a selected superpixel SO(i,j) employed in the method according to the present invention.

The general description of the overall system 10 illustrated in FIG. 1 employs processing techniques designed to reduce the amount of computation and thereby speed up the process of selectively adjusting the image 12. As illustrated in FIG. 2, the digital data may be stored in either storage device 28 or 48 as an array of n by m blocks or superpixels 60 made up of individual pixels 62 in an exemplary 8×8 array. Each superpixel 60 is then transformed using the DCT 32 so that the information has the form of a series of coefficients. In accordance with a technique employed in the present invention, the first coefficient of each superpixel 60 in the domain of the DCT is referred to as the DC value and is proportional to the average value of the entire superpixel 60 of 8×8 individual pixels 62 and roughly represents the brightness level of the entire superpixel 60. When the data is decompressed it may likewise be stored in a similar array or format of superpixels 60. If the DC value is within an acceptable level of brightness as defined by darkness and brightness thresholds, the superpixel is not modified. Under certain conditions, if the DC value is outside of an acceptable brightness level the superpixel is modified in order to bring out the information. Thereafter, the inverse DCT 58 decodes the information for display.

In accordance with an exemplary embodiment of the present invention, a method for adjusting the brightness of large regions is described below in detail. The method must meet certain criteria in order to be effective. Certain high frequency contrast elements should not be modified. For example, details like eyelashes, pupils and texture etc. should not be affected. Large regions should be adjusted to a level sufficient to reveal details within the region. A region of intermediate size should be modified in proportion to its size. Regions of acceptable brightness should not be modified in any way. It is thus desired that the processing technique according to the present invention be capable of distinguishing small and intermediate size areas from large areas. Further, when moving across the boundary from a dark region to a light region or vice versa, the technique according to the present invention modifies the information without producing an artifact or line at the boundary.

In accordance with the present invention, the criterion in which large regions should be adjusted to a level sufficient for detail to be visible requires simultaneous processing of large image segments of the order of 100 by 100 individual pixels. This is computationally costly and may require highly specialized hardware. These difficulties are avoided by the use of hierarchal processing. At a first level of processing, only the DC values of the superpixel 60 formed of 8×8 individual pixels 62 are used. As a result, for an 800 by 600 pixel image, it is necessary only to process 100 by 75 DC values which represent a larger number of individual pixels 62. In accordance with the invention, an algorithm or process is employed which modifies or selectively changes the DC value of selected superpixels stored in storage device 48. Thereafter, inverse DCT 52 decompresses the image for display.

It should be understood that the image compensation stage 50 may be alternatively employed conveniently in the compression stage 24 between human visibility matrix filter 34 and quantizer 36. This is especially useful where it is desired to form and transmit a corrected image such as a TV image to a plurality receivers which do not have image compensation capability. The corrected image would then simply be decompressed without further image adjustment in decompression stage 42.

In the particular embodiment for brightening large dark areas an exemplary superpixel 60 is processed in the image compensating device 48 as described in detail below. It should be understood that bright areas are processed in the same way except for necessary sign changes.

For an array of 100×75 superpixels 60, let S0(i,j) be the average value of a superpixel at the position i,j ($1 \leq i \leq 100$, $0 \leq j \leq 100$).

Form the quantity S1(i,j) defined for a selected darkness threshold value $t_d$ as follows:

$$S1(i,j) = t_d - S0(i,j)$$

The darkness threshold $t_d$ is used to delineate superpixels that will be modified from ones that will not be modified. Darkness threshold $t_d$ is also the value to which all large dark regions are to be raised. As defined, the value S1(i,j) contains both negative and positive values. A negative value of S1(i,j) indicates that the superpixel of interest namely S0(i,j) is above the darkness threshold $t_d$. A positive value of S1(i,j) means that the superpixel of interest S0(i,j) is below the darkness threshold $t_d$ or is in a dark area of an, as yet, undetermined size.

In accordance with the invention, superpixel information is processed in two passes. On the first pass the selected superpixel and, if appropriate, surrounding superpixels in a number (i.e. 5) of sets of superpixels are compared with darkness threshold $t_d$. If at any time the darkness threshold $t_d$ of any superpixel in sets of increasing size is exceeded, the superpixel is assigned a value for size and average. If the darkness threshold $t_d$ is not exceeded in any set up to the maximum number of 5 sets, the superpixel is assigned a maximum size and average value. On the second pass the size of each superpixel is compared with the maximum size value. If any superpixel has a maximum size or is near a superpixel having a maximum size, it is assumed that the superpixel is in a large dark area. Accordingly, the superpixel is increased by the average value of surrounding superpixels. If the superpixel is not in a large dark area, its average is modified by a smoothing characteristic and is added to the value of the superpixel to gradually bring up the value so that artifacts are avoided.

Figure 3A:
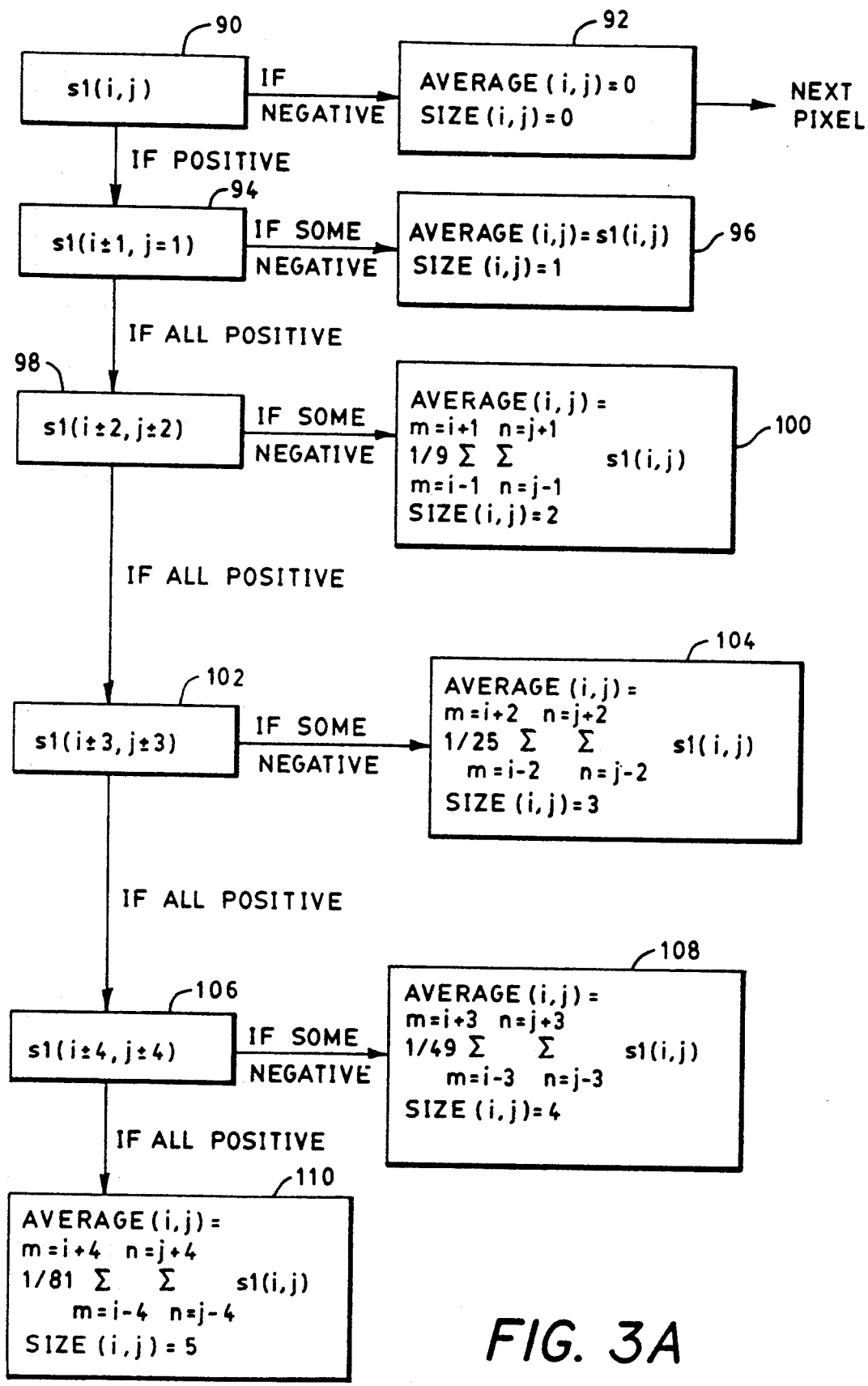
FIG. 3A is a flow chart illustrating a first stage of a method for selectively brightening the image according to the present invention.

The first pass is illustrated in FIG. 3A. On the first pass two arrays of data are computed. One array is called average (i,j) and the other is called size (i,j). For every point (i,j) the equation above is evaluated at block 90 to determine whether S1(i,j) is negative or positive. If it is determined at block 90 that S1(i,j) is negative, then command block 92 sets average (i,j) = 0 and sets size(i,j) = 0 and moves on to the next superpixel. If S1(i,j) is positive, surrounding superpixels are examined to determine if any one surrounding S1 is negative or in an area of sufficient brightness. See for example FIG. 4 in which the exemplary superpixel 60 is surrounded by a 3 by 3 array of superpixels S1(i+n, j+m), (n, n) [−1, 0, +1, +1]. Thus, the superpixel 60 is surrounded by a first set of superpixels 80' which is to be investigated. If any one of the set 80 of superpixels 80', as determined in block 94, is negative, command block 96 sets average-(i,j) = S1(i,j) and size(i,j) = 1.

If all of the superpixels 80' are positive, a next larger set 82 of superpixels 82' surrounding the previous set 80 is investigated. In this case, the superpixels S1(i+n, j+m), (n, n) [−2, −1, 0, +1, 2] are compared with the darkness threshold $t_d$ to see if any superpixel is negative. If one or more is negative as determined by block 98, then command block 100 sets average(i,j) equal to 1/9 of the value of all the superpixels within the set 80 according to the averaging expression in block 100:

$$\text{average}(i,j) = 1/9 \sum_{m=i-1}^{m=i+1} \sum_{n=i-1}^{n=i+1} S1(i,j)$$

and the size(i,j) is set equal to 2.

Once a negative value is sensed the process moves to the next superpixel. However, if all the superpixels 82' in set 82 are positive, it means that all of the locations are below the darkness threshold $t_d$ or are in a dark area. Accordingly, the next larger area or set 84 of superpixels 84' S1(i+n, j+m) (n, m) [−3, −2, −1, 0, 1, 2, 3] is examined in block 102. If any superpixel in the set 84 is negative, i.e. brighter than the darkness threshold $t_d$, the average(i,j) is set equal to the average value of all the superpixels 82' in set 82, according to the averaging expression:

$$\text{average}(i,j) = 1/25 \sum_{m=i-2}^{m=i+2} \sum_{n=i-2}^{n=i+2} S1(i,j)$$

and size(i,j) is set equal to 3 in command block 104. Thereafter the process moves to the next superpixel.

If all superpixels in block 84 are positive, the next set 86 of superpixels 86' is examined at block 106. If any superpixel in set 86 is negative, the average(i,j) is set equal 1/49 of the value of the superpixels 84' in set 84, according to an averaging expression shown in command block 108 but which is not repeated here. Size(i,j) is set equal to 4 in command block 108.

Finally, if all the superpixels in the set 86 are positive, the average(i,j) is set to 1/81 of the value of the superpixels 86' within the set 86, according to the averaging expression in command block 110. Size is set equal to 5 in command block 110. In accordance with the invention, the process depicted in FIG. 3A is designed to populate an array of average and size values for each and every superpixel 60 in the array.

Figure 3B:
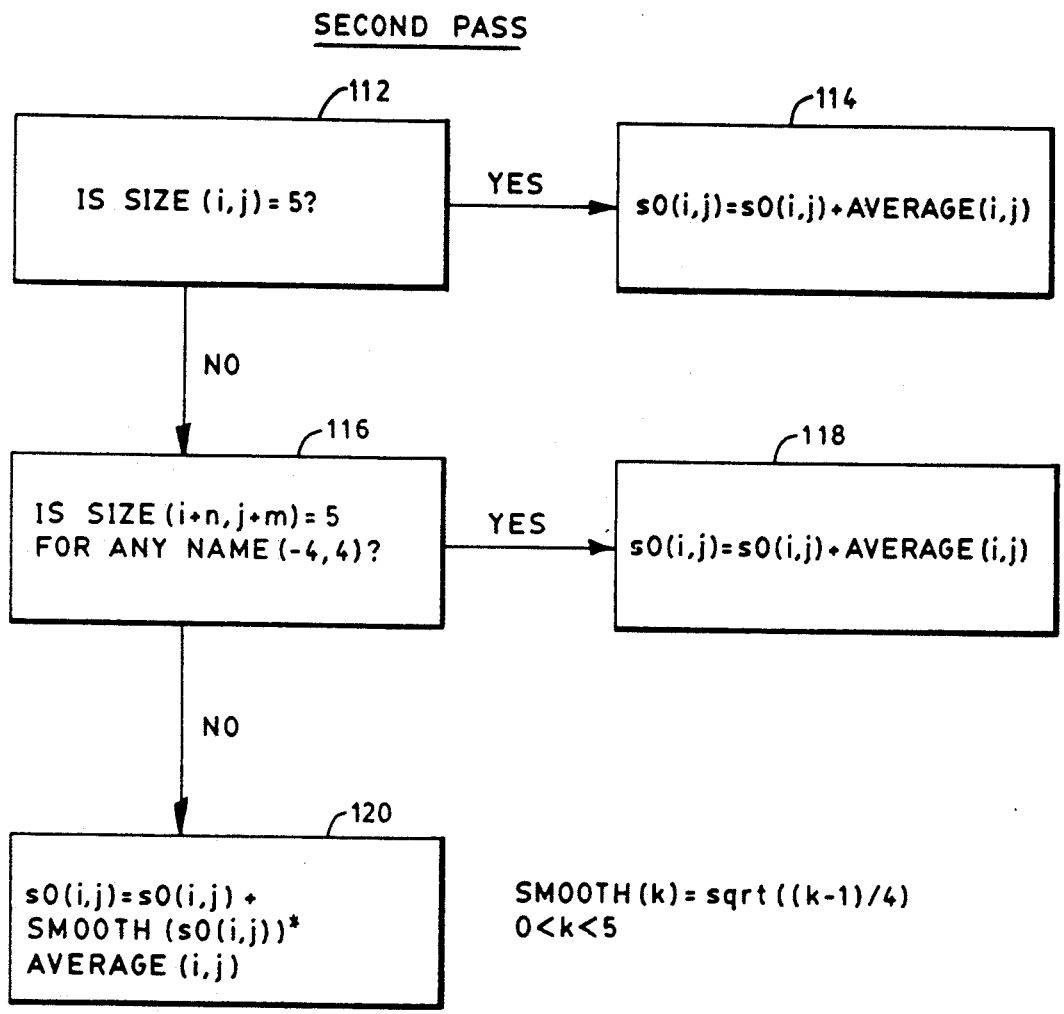
FIG. 3B is a flow chart illustrating a second stage of a method for selectively brightening the image of the present invention.

The second pass is illustrated in FIG. 3B. In this sequence, each superpixel (i,j) in the array is examined for size. In block 112 the size is compared with the largest available size namely 5. If the value of size associated with the superpixel 60 is 5, the value of the superpixel 60 is expressed in block 114 as follows: S0(i,j) = S0(i,j) + average(i,j), where S0(i,j) is the initial value of the superpixel 60 and the average(i,j) is the average value assigned to the superpixel during the first pass according to the appropriate averaging expression. If the size of superpixel 60 is not 5, a size inquiry for the superpixels in set 86 is made at block 116. If the size of any superpixel S1(i+n, j+m), (n, m) $\epsilon$[−4, −3, −2, −1 0 +1, +2, +3, +4] is 5 then the value of the superpixel 60 is set in accordance with the expression in command block 118. In the example, S0(i,j) = S0(i,j) + average(i,j) for the size of the pixel investigated. In other words, if the superpixel under consideration is not a 5 but is near (i.e. within 4 superpixels of) any superpixel having a size 5, then it is said to be within a large dark area. Accordingly, the value of the superpixel 60 is increased by the average value of the superpixels for that size, i.e. within block 86. This form of adjustment does not preserve contrast at the boundary and thereby reduces the occurrence of halo artifacts.

If there is no superpixel within 4 which has a size 5, this means that the superpixel 60 is not in a large area but is in an area of intermediate or small size. If such is the case, the value of the superpixel 60 is modified in accordance with a smoothing function as follows: S0(i,j) = S0(i,j) + smooth (k).average(i,j) where smooth k is a smoothing function which may take various forms such as a ramp function, a logarithmic function or other suitable function. An exemplary smoothing function may be expressed as follows:

$$\text{Smooth }(k) = \sqrt{(k-1)/4}$$

$$0 \leq k \leq 5$$

The smoothing function in block 120 is also designed to prevent discontinuities or artifacts from appearing as a result of insufficient brightness adjustment in regions near a boundary.

In accordance with the invention, the two step or double pass process illustrated in FIGS. 3A and 3B uniquely differentiates electronic imaging from conventional imaging. The process selectively recognizes problem areas, i.e. large dark areas and corrects them without degrading the rest of the scene. It makes use of the large computation required for image compression and only introduces a marginal increment in the calculations by manipulating expressions of already reduced complexity. The process is best implemented when a sufficiently wide dynamic range of information is available as an input. If the information captured is a relatively low luminance or is noisy or clipped, results lead to less dramatic, although perceptional improvements without degradation of the scene.

Figure 4:
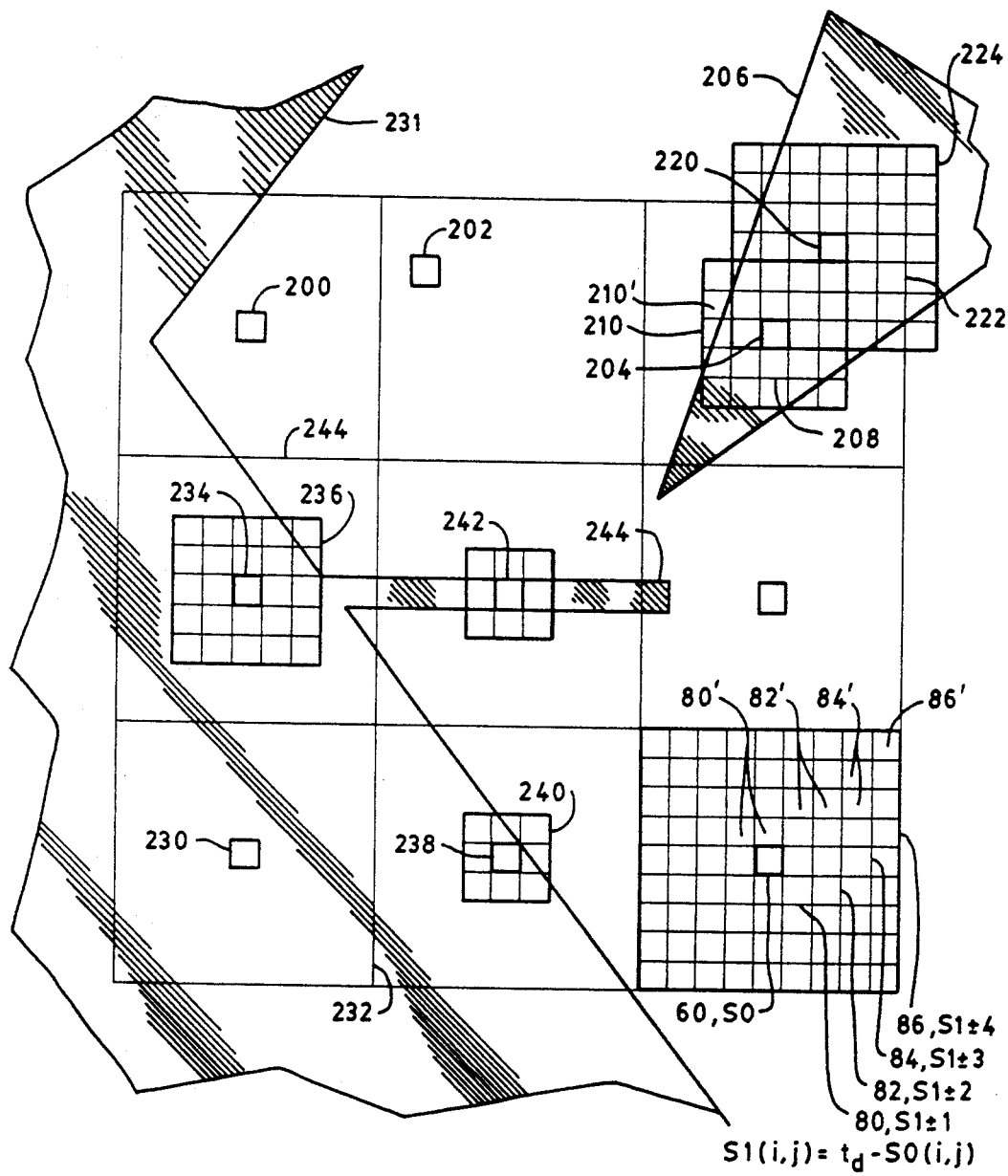
FIG. 4 illustrates various exemplary boundary conditions of an array of superpixels.

In FIG. 4 referred to above a number of examples are illustrated to assist in the understanding of the invention. Superpixels take the form of numbered blocks. For example, the superpixel 60 illustrated in the lower right hand corner of the drawing is surrounded by the progressively larger areas 80, 82, 84, 86 made up of groups of corresponding superpixels 80', 82', 84', 86', which exemplify the hierarchy by which each superpixel is investigated.

A number of additional exemplary superpixels will be investigated in order to further illustrate the hierarchial structure of the invention. In FIG. 4 the shaded areas represent superpixels which are below the darkness threshold $t_d$. An exemplary superpixel 200, which is in the upper left hand portion of FIG. 4 is in an area of sufficient brightness and thus satisfies the condition S1(i,j) is negative. Accordingly, from FIG. 3A, its average is set to zero and its size is set to zero, and another superpixel may be investigated. Similarly, and for the sake of brevity, another superpixel 202 has the same resulting characteristic average and size. Superpixel 204, however, lies in a darkened area 206. In accordance with the processing technique illustrated in FIG. 3A, the superpixel 204 is determined to be positive in block 90. Accordingly, a next larger set of superpixels 208 is examined in block 94. Because all of the superpixels in the set 208 lie within the darkened area 206 they are deemed to be positive. It is therefore necessary to look at the superpixels in set 210. In the example, some of the superpixels in set 210 lie outside the darkened area 206. Therefore, at least one of the superpixels 210' in the set 210 is negative. Accordingly, the average is set equal to the expression within block 100 of FIG. 3A, that is, the average equals the average of the next smaller set of superpixels 208. The size is set equal to 2.

Superpixel 220 which is also within the dark area 206 has a size equal to 3 as determined by expanding the investigation to the superpixels in set 224 and has an average equal to the expression within block 104, namely the average value of the set of superpixels 122.

Superpixel 230 in the lower portion of large dark area 231 of FIG. 4 has a size 5 and an average equal to the expression in block 110 of FIG. 3A which is the maximum for any superpixel in a large area. Superpixel 234 also in large dark area 231 near the boundary has a size 2 defined by the set of superpixels 236 and an average value as set forth in block 100 of FIG. 3A. Superpixel 238, also near the boundary of large dark area 231 has a size 1 determined by the set of superpixels 240 and an average value of S1(i,j) as shown in block 96 of FIG. 3A. Superpixel 242 also has a size 1 and an average value of S1(i,j).

In accordance with the invention each superpixel is examined on the second pass to determine whether and by how much each superpixel is to be adjusted. Superpixels 200 and 202 are not brightened at all because they are above darkness threshold $t_d$. Superpixel 230 has a size 5 accordingly its new value is increased by the average(i,j) for a size 5 pixel, namely by the amount set forth in block 110 of FIG. 3A. Pixel 234 has a size 2. In accordance with FIG. 3B, therefore if any superpixel within 4 superpixels, i.e. within the area 244, is itself a size 5 then the superpixel 134 is increased by the average for its own size. In other words, superpixel 234 is increased by the average value of all the superpixels in its vicinity corresponding to its size. Likewise, superpixel 238 is adjacent to superpixels having a size 5. Accordingly, it is increased at the amount average(i,j) for its size namely 1. Because the value added to the superpixel depends on its size and on the average value of the pixels surrounding it, the degree by which it is brightened is inherently related to neighboring pixels and is therefore less noticeable. Also the method permits adjustment up to the boundary without preserving the contrast.

For example, if superpixel 238 has an initial value of 10 on a scale of 256 and superpixel 240 has an initial value of 250 on the same scale, the difference 240 represents the contrast. If the minimum brightness allowed is 50, superpixel 238 may be raised to that value. Likewise, if the maximum brightness allowed is 240, superpixel 240 may be lowered to that value. The difference 190 represents the new contrast at the boundary between the superpixels. By not preserving the initial contrast, halo artifacts are avoided.

Superpixels 204 and 220 are in area 206 which is an intermediate size. Neither of these superpixels are size 5 or within 4 superpixels of a size 5 superpixel. Therefore, each is multiplied by the smooth k function (block 120 of FIG. 3B) for its corresponding size which thereby avoids an artifact at the edge or boundary of area 206.

Superpixel 242 is in a small dark area 244. It has a size = 1 and an average = S1(i,j). It is not within 4 superpixels of a size 5 superpixel. Accordingly it is multiplied by the smooth k function, which for a size 1 superpixel equals zero. Accordingly, superpixel is not adjusted. In fact, no superpixel in the area 244 would be adjusted because none are in a sufficiently large area.

In some anomalous situations a large dark area may have a very narrow portion. In such situations the second pass will operate to employ the smooth k function. This represents an approximation of the ideal which normally is not noticeable. If the resulting image is not satisfactory the sensitivity may be changed by adjusting the threshold.

The principles of operation of the invention as set forth in the foregoing examples are also applicable to adjusting or reducing the brightness of bright areas. When a superpixel is too bright, i.e. above a selected brightness threshold $t_b$ (preferably different from the darkness threshold $t_d$), it is analyzed and adjusted in the same way except that the superpixel is ultimately darkened.

In employing the invention to distinguish and adjust the brightness of large bright areas above the brightness threshold $t_b$, the expression $S1(i,j) = t_b - S0(i,j)$ is evaluated such that if S1 is negative the superpixel under consideration is determined to be above the threshold, i.e. too bright. In such a case on the first pass, illustrated in FIG. 2A, size and average are assigned in blocks 92, 96, 100, 104 and 108 on the occurrence of a positive S1(i,j). The area investigated in blocks 94, 98, 102, 106 and 110 is expanded on the negative occurrence of S1(i,j). The second pass is not changed except that the sign of the average value added to the superpixel is changed in order to darken the superpixel.

The process may be performed with both a darkness threshold $t_d$ and a brightness threshold $t_b$ for adjusting the brightness of an image having extremes at both ends. After adjusting the brightness of a superpixel by varying the first coefficient, the individual pixels may be adjusted, for example simply by performing an inverse DCT operation.

Figure 5:
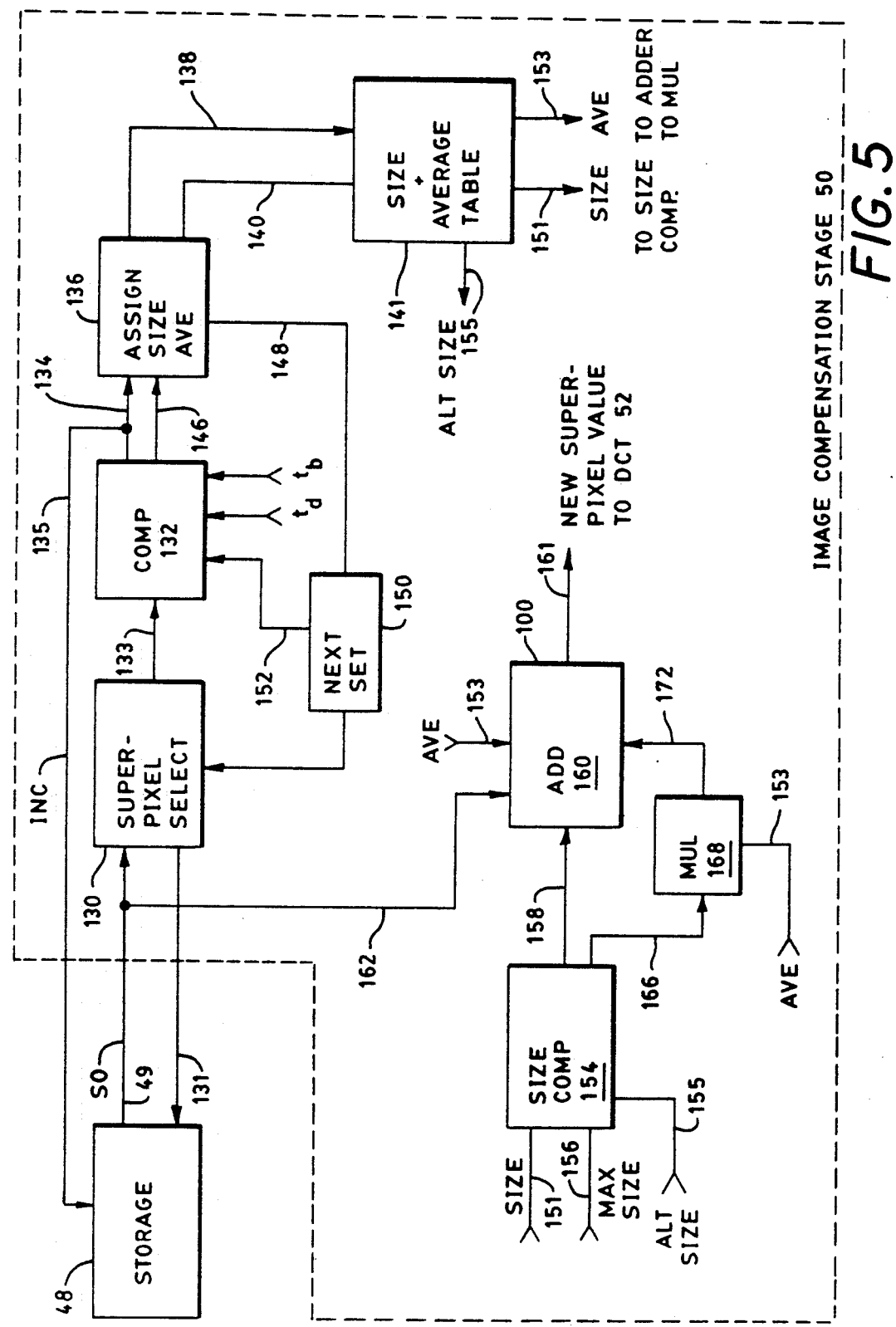
FIG. 5 is a schematic block diagram of an exemplary system in accordance with the invention for selectively adjusting the brightness of selected areas within an image.

In accordance with the invention, an apparatus for effecting image compensation is illustrated in FIG. 5. Storage device 48 transfers data to image compensation stage 50 over line 49 (from FIG. 1). The data may be in the form of a 5×5 array of superpixels centered on S0(i,j). When activated, by an enable signal on line 131 from superpixel select 130, the storage device 48 transfers data to superpixel select 130 which receives and stores the 5×5 array. The value of the superpixel S0(i,j) is coupled to comparator 132 on line 133 and compared with either or both the darkness threshold $t_d$ or brightness threshold $t_b$ as illustrated. The comparator 132 produces a first signal on line 134 if the value of the superpixel is above the darkness threshold $t_d$ and/or below the brightness threshold $t_b$ indicating that the superpixel is at an acceptable level of brightness such that compensation is not necessary. Accordingly, the signal is fed back to storage 48 on line 135 which increments the data by one superpixel, e.g. SO(i+1, j) to resupply superpixel select 130. Assign size/average block 136 assigns a selected size and average to the superpixel in response to the first comparator output. The size value is placed on line 138. The average value is placed on line 140. The size and average value are fed to size and average value table 141. Respective size, average, and alt size outputs thereof 151, 153 and 155 are used at a later stage.

If the superpixel value is below the darkness threshold $t_d$ or above the brightness threshold $t_b$, the comparator 132 produces a second output on line 146 which causes the assign size/average block 136 to produce an output on line 148 which increments the next set 150 causing the superpixel select 130 to examine superpixels around the superpixel of interest SO(i,j). The next set block 150 is activated up to a maximum number of sets, which in the present invention is four (4) surrounding sets. The value of the set is coupled to the comparator 132 on line 152 to indicate when a maximum number of sets has been compared.

The size output 151 from table 141 is coupled to size comparator 154 which compares the superpixel size with the maximum size value at input 156. If the size of the superpixel is greater than the maximum, size comparator 154 produces an output on line 158. Adder 160 is coupled to average output 153 of table 141 and to data line 49 over line 162 and is responsively coupled to size comparator output 158. The average value and superpixel value are algebraically added to produce a new superpixel value on line 161 which is coupled to the inverse DCT 52. The size comparator 154 also receives alt size input on line 155 if any superpixel within a selected number of superpixels from the superpixel of interest is the maximum size. If any such superpixel has such a maximum size, the average value is likewise algebraically added in block 160 to the pixel value on line 162.

If the size of the superpixel is below the maximum and any superpixel within a selected number of superpixels is below the maximum, the size comparator 154 produces an output on line 166 which causes a multiplier 168 to multiply the average value on line 153 by a smooth k function. The result of which is coupled to the adder 160 on line 172 to be algebraically added to the pixel value on line 162. The output of the adder on line 161 is coupled to the inverse DCT as indicated.

In accordance with the invention, superpixels in large dark or bright areas are adjusted by a maximum amount, superpixels in smaller intermediate dark or bright areas are adjusted by an amount commensurate with the particular size and superpixels in the mid brightness range are unaltered.

While there has been described what at present are considered to be the preferred embodiments of the present invention it will be apparent to those skilled in the art that various changes and modifications may be made therein without departing from the invention and it is intended in the accompanying claims to cover all such changes and modifications as fall within the true spirit and scope of the invention.

What is claimed is:

1. A method for adjusting the value of each one of a plurality of select pixel groups comprising one or more individual pixels which collectively define an image comprising the steps of:

comparing the value of each pixel group with at least one of a darkness threshold and a brightness threshold;

incrementally enlarging the comparison of each pixel group to an area encompassing surrounding select pixel groups until any pixel group within the comparison area exceeds the darkness threshold or is less than the brightness threshold up to a maximum area of comparison;

assigning a value of size and average to each select pixel group in accordance with the incremental amount of area thereabout entirely below the darkness threshold or above the brightness threshold up to a maximum size and average; and comparing the size of each select pixel group with a certain maximum size and adding the assigned average value of that pixel group to the pixel group value when that pixel group is at least the maximum size or when any pixel group within a predetermined distance thereof is the maximum size, or alternatively multiplying the average value of each pixel group by a smoothing characteristic and adding the result to that pixel group value when that pixel group is less than the maximum size and no other pixel group within the predetermined distance is the maximum size.

2. The method of claim 1 wherein the maximum size and area are defined by all the pixel groups within an area spaced four pixel groups from the selected pixel group.

3. The method of claim 1 wherein the step of assigning the value of size to each pixel group comprises determining the area defined by a number of pixel groups from each select pixel group in which no pixel group has a value above the darkness threshold or below the brightness threshold.

4. The method of claim 1 wherein assigning an average to each select pixel group comprises averaging the values of all pixel groups within an assigned size surrounding each select pixel group entirely below the darkness threshold or entirely above the brightness threshold.

5. The method of claim 1 wherein the maximum size is 5 and the predetermined distance is four pixel groups.

6. The method of claim 1 wherein the smoothing characteristic is defined by $\sqrt{(k-1)/4}$ where k is the size of the selected pixel group.

7. The method of claim 1 further comprising the step of selecting sequentially the pixel groups for comparison with the darkness or brightness thresholds.

8. The method of claim 7 wherein the step of selecting pixel groups comprises selecting a first pixel group for comparison with the darkness or brightness thresholds and thereafter selecting a next pixel group for comparison with the thresholds when the value of the first selected pixel group is either higher than the darkness threshold or lower than the brightness threshold or when the value of all pixel groups within an integral number of pixel groups from the first selected pixel group is either higher than the darkness threshold or lower than the brightness threshold up to the maximum size.

9. The method of claim 1 wherein the pixel groups comprise an 8×8 array of individual pixels.

10. The method of claim 1 further comprising adjusting the brightness of each pixel group without preserving contrast at boundaries between large dark areas and large bright areas.

11. A method for selectively adjusting the brightness of a plurality of select pixel groups comprising one or more individual pixels which collectively define an image comprising the steps of sequentially selecting pixel groups from the image;
   comparing the value of each pixel group selected with a threshold defining an acceptable level of brightness and expanding the comparison to other pixel groups in succeeding concentric adjacent sets if the value of the initial pixel group is not within the acceptable level of brightness and until the value of at least one of the other pixel groups in the concentric adjacent sets is within the acceptable level of brightness up to a maximum number of sets corresponding to a predefined large area;
   assigning a size and average value to each pixel group in the image in accordance with the number of concentric sets of other pixel groups compared and the average value of such other pixel groups so compared which are not within the acceptable level of brightness; and
   comparing the size of each pixel group with the size associated with the predefined large area and adding the average to that pixel group when the size of that pixel group corresponds to the size of the large area; and if that pixel group does not correspond to the size of the predefined area, thereafter comparing the size of all other pixel groups within a selected number of pixel groups from that pixel group with the size associated with the predefined large area and adding the average to that pixel group when the size of the any other pixel group within the selected number of other pixel groups has a size corresponding to the predefined large area; or alternatively multiplying the size of each pixel group times a smoothing factor when the size of that pixel group and all other pixel groups within the selected number of pixel groups is less than the size associated with the predefined large area and adding the resulting value to the size of that pixel group, so that the amount added to each pixel group operates to bring that pixel within the acceptable level of brightness.

12. The method of claim 11 wherein the threshold defines at least one of a brightness threshold and a darkness threshold and the acceptable level of brightness is between the brightness threshold and darkness threshold.

13. The method of claim 11 further comprising adjusting the values of pixel groups without preserving contrast at boundaries of predefined large areas.

14. A method for hierarchal processing of a digital image made up of an array of pixel groups of one or more pixels in which each pixel group is provided a value by selectively adjusting the brightness of pixel groups in large areas of generally uniform brightness of the image without the necessity of preserving contrast comprising the steps of:
   selecting incrementally a pixel group from the array;
   comparing the value of the pixel group with a threshold;
   producing a first signal when the selected pixel value is at a level in comparison to the threshold indicative of a pixel group of sufficient brightness and producing a second signal when the selected pixel group value is at a level in comparison to the threshold indicative of a pixel group which may require selective brightening adjustment;
   assigning a first size and average value to the selected pixel group and selecting the next succeeding pixel group in response to the first signal;
   selecting each one of a first set of other pixel groups surrounding the selected pixel group in response to the second signal and comparing the value of each of the other surrounding pixel groups with the threshold, producing the first signal when the value of any of one of the surrounding pixel groups is at a sufficient brightness and producing the second signal when the value of all the pixels in the surrounding set require selective brightening adjustment;
   assigning a next larger size relative to the first size and corresponding average value to the selected pixel group and selecting the next succeeding pixel group in response to the first signal;
   selecting each one of a second set of other pixel groups surrounding the first set and comparing as recited above to produce one of the first and second signals accordingly and assigning a next successive larger size and corresponding average value to the selected pixel group up to a maximum number of selections; and
   adjusting the value of the selected pixel group in accordance with the average and size assigned to the selected pixel group.

15. The method of claim 14 wherein the adjusting step comprises the steps of:
   comparing the size of each pixel group and any other pixel group within the largest set surrounding that pixel group with the size for the maximum number of selections and algebraically adding the average to that pixel group value when the size of that pixel group is the maximum, or if any other pixel group within the largest set surrounding that pixel group equals the maximum thereby adjusting the brightness of the selected pixel group by the maximum average amount for its size; or alternatively multiplying that pixel group value times a smoothing factor algebraically and adding the result to that pixel group value when the value of that pixel group and any other pixel groups within the largest surrounding set are not equal to the maximum so as to adjust the brightness of that pixel group to a lesser extent.

16. The method of claim 14 further comprising performing all the steps except the adjusting step on a first pass for each pixel group and performing the adjusting step on a second pass for each pixel group.

17. The method of claim 14 wherein the pixel groups are formed by compressing digital image data representing individual pixels and combining the data of a plurality of individual pixels.

18. The method of claim 17 wherein compressing digital image data comprises a discrete cosine transform (DCT) and combining the data comprises representing an average value of an $n \times m$ array of individual pixels by a coefficient of said DCT.

19. The method of claim 18 wherein the assigning step further comprises varying the coefficient of the DCT to produce a corrected pixel group.

20. The method of claim 19 further comprising performing an inverse DCT on the corrected pixel groups for interpolating individual pixels in the image to a corrected level.

21. Apparatus for compressing the dynamic range of a digital image, made up of an array of pixel groups of one or more pixels in which each pixel group is provided a value, by selectively adjusting the brightness of pixel groups in large areas which are at an unacceptable level of brightness comprising:

a selector for selecting pixel groups;

a comparator responsive to the selector for sequentially comparing each selected pixel group with the acceptable level of brightness and producing a first output when the selected pixel group value is an acceptable level of brightness and producing a second output when the selected pixel group value is not an acceptable level of brightness indicative of a pixel group which may require selective brightening adjustment;

means for causing the selector to increment to the next succeeding pixel group in response to said first output;

means for assigning size and average values to the selected pixel group being responsive to the first output for assigning a corresponding size and corresponding average value for the selected pixel group, and being responsive to the second output for causing the selector to select other pixel groups in a set surrounding the selected pixel group for comparison by the comparator with the acceptable level of brightness, said comparator being responsive to produce said first and second outputs up to a selected maximum number of succeeding sets of surrounding pixel groups;

a size comparator for comparing the corresponding size of each selected pixel group with the maximum size and the size of other pixel groups in a select surrounding set within the maximum size and producing a first size output when the size of the selected pixel group is the same as the maximum size or the size of any other pixel group within the select surrounding set is the maximum size and providing a second size output when the size of the selected pixel group or any other pixel group within the select surrounding set is less than the maximum; and means responsive to the first size signal for adding the value of the selected pixel group to the average value of that pixel group for the selected number of sets for that pixel group and means responsive to the second size signal for multiplying the value of the selected pixel group by a smoothing characteristic in accordance with the size of that pixel group and adding the resulting value to the value of the selected pixel group, said means producing outputs indicative of the amount of brightening adjustment for the selected pixel groups.

22. The apparatus of claim 21 wherein the acceptable level of brightness is above a darkness threshold and below a brightness threshold and the means for adding the value of the selected pixel groups to the average value of that selected pixel group operates to increase the brightness of pixel groups below the darkness threshold and to reduce the value of pixel groups above the brightness threshold.

23. Apparatus for selectively adjusting the brightness of a digital image made up of pixel data elements comprising:

comparator means for comparing each pixel data element with a threshold representative of an acceptable level of brightness and producing outputs corresponding to acceptable and unacceptable levels of brightness;

means for selectively producing a corresponding size and average value for each pixel data element in response to the comparator output representing acceptable brightness;

means responsive to the comparator means for selectively varying the size of the pixel data element to include selected adjacent pixel data elements in response to the comparator output representing an unacceptable level of brightness up to a maximum size, each size having a corresponding average value; and means for adjusting the brightness of the pixel data element in accordance with the corresponding average value.

24. The apparatus of claim 23 wherein the means for adjusting the brightness of the pixel data element further includes means responsive to the size of the pixel data element and the size of adjacent pixel data elements; size comparator means for comparing the size of the pixel data elements with a selected size value and means for varying the adjustment when the size of the pixel data elements are less than the selected size value.

25. The apparatus of claim 23 wherein the pixel data element represents one pixel.

26. The apparatus of claim 23 wherein the pixel data element represents an array of pixels.

27. The apparatus of claim 23 further comprising means for compressing the pixel data elements.

28. The apparatus of claim 27 wherein the means for compressing the pixel data elements comprises a discrete cosine transform.

* * * * *